No. 894,014.  
E. B. KILLEN.  
RUBBER TREAD OR TIRE FOR WHEELS.  
APPLICATION FILED OCT. 27, 1906.  
PATENTED JULY 21, 1908.  
3 SHEETS—SHEET 1.
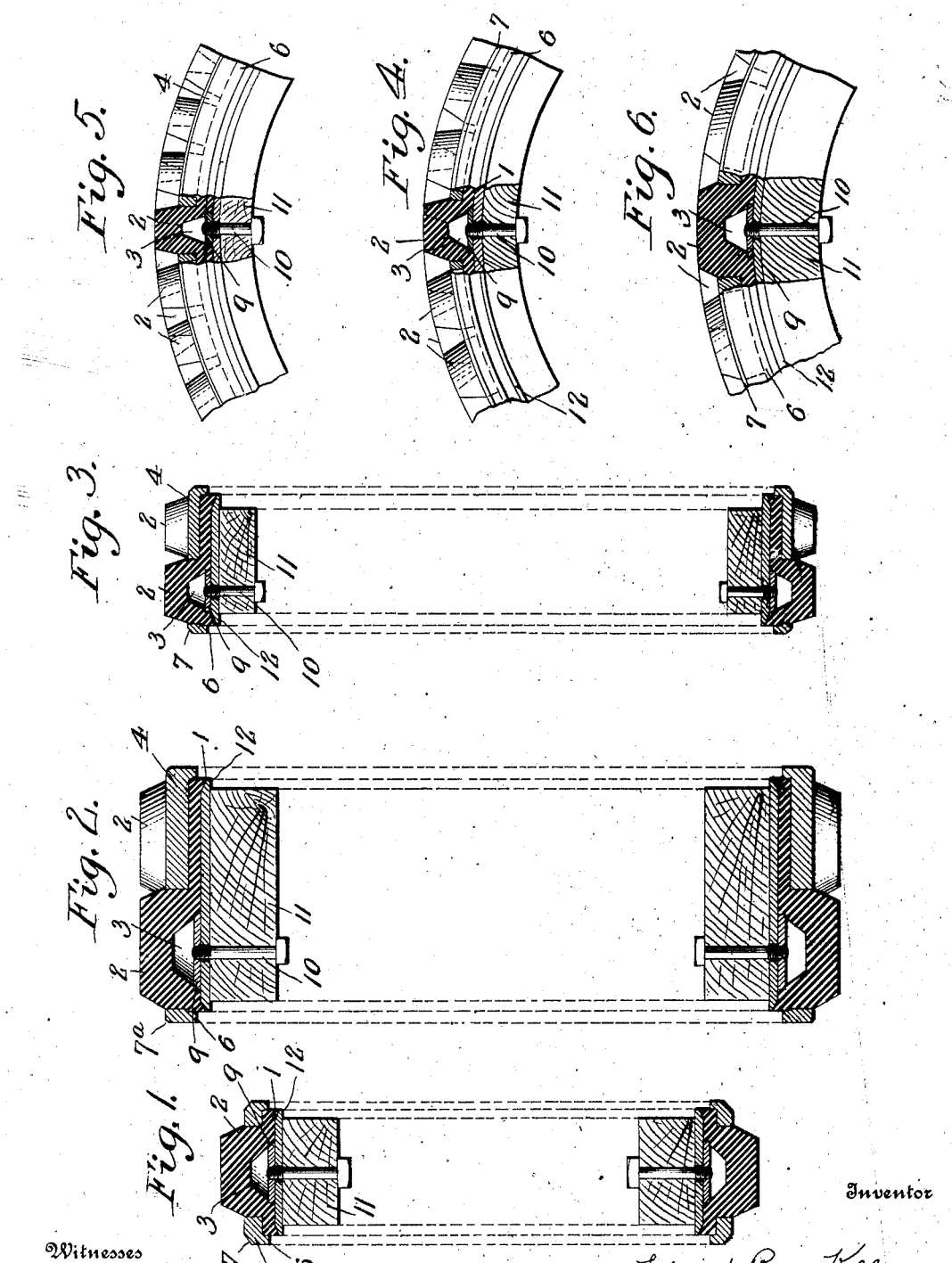

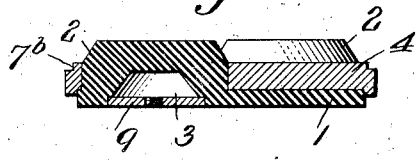
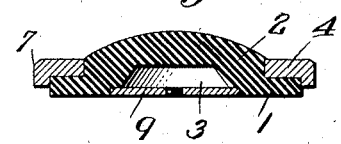
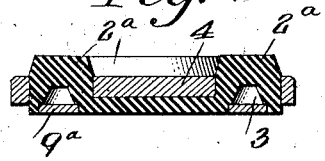
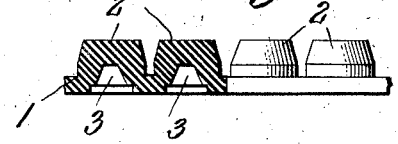
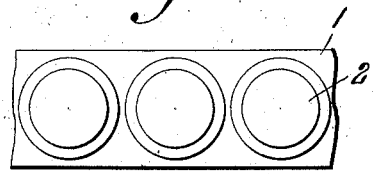
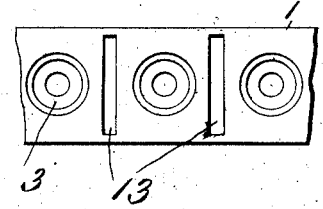
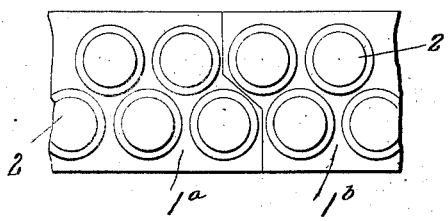
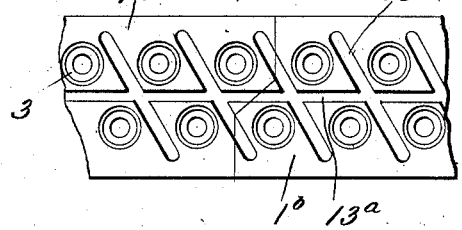

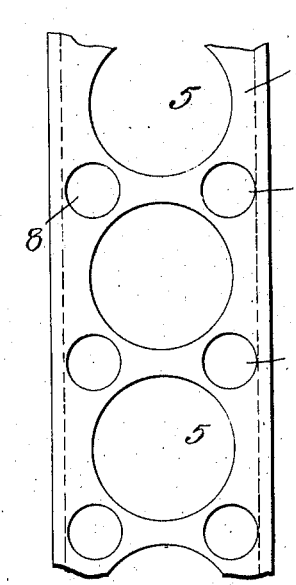
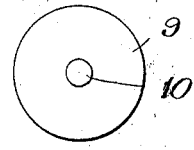
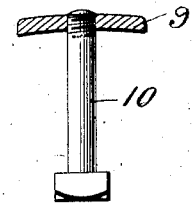
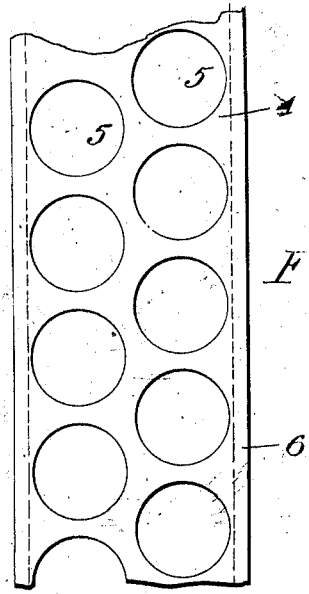
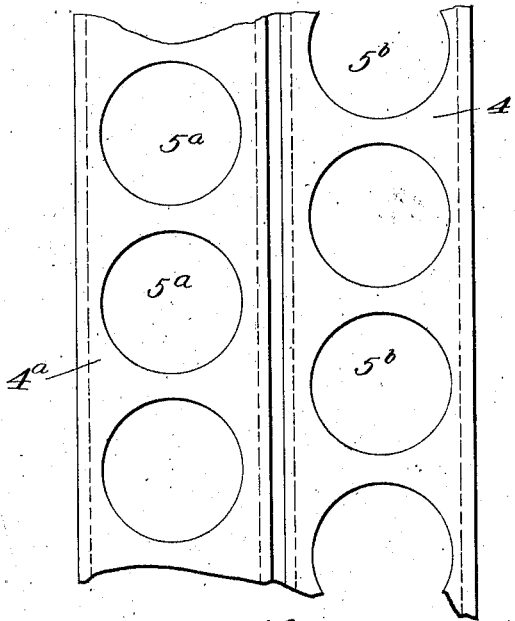
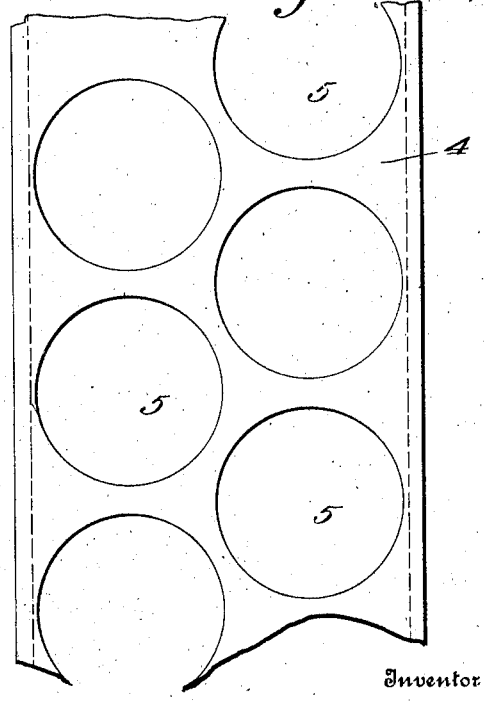

UNITED STATES PATENT OFFICE.

EDWARD BRICE KILLEN, OF LONDON, ENGLAND.

RUBBER TREAD OR TIRE FOR WHEELS.

No. 894,014.    Specification of Letters Patent.    Patented July 21, 1908.

Application filed October 27, 1906. Serial No. 340,867.

*To all whom it may concern:*

Be it known that I, EDWARD BRICE KILLEN, of 52 Queen Victoria street, London, England, have invented certain new and useful Improvements in Rubber Treads or Tires for Wheels, of which the following is a specification.

The present invention relates to improvements in rubber treads or tires for wheels. The improved tread or tire is efficient, not only for lighter traffic but also for heavy traffic, even up to twelve tons. The tire possesses not only the required sensitiveness to enable it to absorb road shocks but also great durability and is so constructed and attached to a wheel proper that forces which come into play in its use and tend to wrench it off are withstood and the head of the stud is not nipped or cut between the steel binding rim and the ground. The tire consists principally of two wearing parts, one of which is a rubber part while the other is a binding metal rim. The improved tire prevents the dangerous skidding and slipping which prevails in all the present solid rubber and pneumatic tires and it does not throw mud laterally when traveling over muddy roads.

The invention is shown in the accompanying drawings, in which:

Figure 1 is a transverse section through a part of a complete tread or tire showing my improvements. Figs. 2 and 3 are similar views showing a wheel provided with a zigzag or double tread. Fig. 4 is a side view, partly in section, of the tire shown in Fig. 3. Figs. 5 and 6 are views similar to Fig. 4 and showing some slightly modified forms of the rubber studs, Figs. 7, 8 and 9 are transverse sections of different forms of the rubber part and the metal rim, Fig. 10 is an elevation, partly in section, of the rubber part, Figs. 11 and 12 are plan views of different forms of the rubber part, Figs. 13 and 14 are bottom plan views of the rubber part shown in Figs. 11 and 12, Figs. 15, 16, 17 and 18 are plan views of different forms of the metal binding rim, Fig. 19 is a plan view of the washer and bolt and Fig. 20 is an elevation, partly in section, of the washer and bolt.

The rubber part of the tire is preferably molded on the flat in a straight mold out of one continuous piece and comprises a base 1 from which project round studs 2. These studs may be arranged in a circular line as shown in Figs. 1, 8, 10, 11 and 13 or they may be arranged in a zigzag line as shown in Figs. 2 to 7, 12 and 14. The studs project outwards from the base a distance varying with the purpose for which the tire is intended. In the case of light traffic they may project about half to three quarters of an inch from the base and in case of heavy traffic they may project from one to two inches from the base. The studs may be spaced apart a suitable distance, for instance half an inch. The inner circumference of the rubber part is molded with suitable recessed air spaces 3 which may be in form of an inverted dish and which are spaced a suitable distance apart and have their open bases on the inside circumference of the rubber part. The number of these air spaces exactly corresponds to the number of studs and they are so arranged that each stud has a corresponding air space beneath it. The top of the studs may be flat or it may be substantially spherical as shown in Fig. 8.

4 indicates an angled metal rim having round holes 5 made therein to take the heads of the rubber studs which pass right through the holes leaving only what may be termed the necks of the studs surrounded, supported and protected by the smooth walls of the holes in the metal rim. The rim has suitable flanges 6 at both its edges, the flanges projecting inwardly towards the center of the rim. The edges of the outer circumference of the rim are inclined as shown at 7 in Figs. 1, 3, 8 and 9 or they may round as shown at $7^a$ in Fig. 2 or formed with reëntrant angles as shown at $7^b$ in Fig. 7. The flanges on the rim permit of the rim fitting tightly over and thoroughly protecting the rubber edge at each side of the base 1 of the rubber part without preventing the rubber base from spewing externally. The rim floats on the rubber part when the tire is fitted over the wheel proper and is always isolated from the wheel proper by rubber and air. The metal of the rim, between the stud holes, may be left thicker thereby strengthening what might be weak parts and the rubber part is molded to fit exactly into and close against the thickened part of the metal rim. The rim should be boltless and should be truly circular on its inner and outer circumference.

In addition to the studs 2 the rubber part may be formed with smaller studs $2^a$ (see Fig. 9) at its sides and the rim would then be formed with small openings 8 (see Fig. 15) to receive the studs $2^a$.

The insertion of each rubber stud in its corresponding hole in the metal rim causes the rubber part to cling to the metal rim. To prevent the tire from coming off the wheel proper or from creeping on it I provide suitable perforated disks or washers 9 which are inserted in the recessed air spaces 3 before the tire is fitted over the wheel proper. The disks or washers are preferably round but may be of any desired shape provided they fit tightly in the recessed air spaces into which they may project a quarter of an inch. They serve a double purpose in that they preserve the shape of the base of the air space and in that, when held and retained as hereinafter mentioned, they serve to prevent the tread or tire being wrenched off the wheel proper. The washers are held and retained in their proper position relative to the wheel proper by means of the ends of screw bolts 10 which bolts pass through the felly 11 and the metal rim 12 of the wheel proper or through the treading or flat rim of a metal wheel. For lighter traffic it is not necessary that all the disks or washers should be provided with screw bolts and some of the washers may therefore be imperforate as shown at 9$^a$ in Fig. 9.

The air space bases when filled by the washers are substantially sealed when the tread or tire is fitted and squeezed under compression onto the metal rim of the wheel proper, but under load the pressure of the base of the rubber part against the metal rim of the wheel automatically renders the sealing of the air spaces more perfect.

It will be seen from the drawings that what I have termed the neck of the stud is supported and protected by the walls of the round holes which take the stud. The rubber in the running surface of the stud is automatically contracted under compression in action and, as the studs come into ground contact, the rubber so spews into the air spaces that the heads more or less completely retire contracted into safe quarters. With lighter traffic this happens to a less degree than with heavier traffic, in fact with very heavy traffic the binding rim may become a part of the treading surface which thus becomes of two densities, viz. that of metal and rubber respectively. For lighter traffic the air spaces may be larger and for heavier traffic the air spaces may be smaller. Figs. 1 to 10 shows different shapes and sizes of the air spaces.

If the rubber part is constructed with its parts proportioned substantially as shown in the drawings the rubber is not stretched in action beyond its elastic limit. The holes in the rim should be of such size and height relative to the diameter and height of the necks of the studs that they tightly take the latter and that no disadvantageous friction is developed when the stud is in ground contact between the wall of the holes and the necks of the studs. The holes should so take the necks that the heads can be forced through into position by hand pressure or by means of a small hand-operated lever.

On the inner circumference of the base 1 of the rubber part I may mold other open air spaces which may run transversely as shown at 13 in Fig. 13 or they may run longitudinally or obliquely as shown at 13$^a$ and 13$^b$ in Fig. 14. These air spaces are closed by squeezing the rim 4 over the wheel proper. One or more of these pneumatic treads or tires may be attached to the circumference of one wheel in which latter case the stud of one tread should occupy a position in the middle between the studs on the other tread. The binding rims 4$^a$ and 4$^b$ of such a double tire are shown in Fig. 16, in which 5$^a$ and 5$^b$ indicate the staggered openings of the two rims. In the case of slowly moving heavy traffic it is always advantageous to use two treads placed as above described or to make the tread zigzag or double.

The base 1 of the rubber part, although squeezed on over the wheel proper when attached to the wheel, has always plenty of spew room, not only at both its base edges but also internally in the many internal air chambers 5 and 13, and the rubber part is therefore capable of absorbing the road vibration with remarkable efficiency. In fact room is left for some displacement of almost all the rubber in the rubber part and the elastic rubber is nevertheless held efficiently in its proper position on the circumference of the wheel proper, and the construction of the tire is such that the ground contact bearing surface of the pneumatic or elastic tire is small.

The rubber part may be efficiently and cheaply patched if part of it is torn or worn away under great strain and the patched tread then becomes practically as good as it was originally. This patching may be done by bringing together and suitably joining the rubber ends to be attached by inserting through one of the holes 5 in the rim 4 two half studs, thereby making the split stud into a joint one and any number of separate patched parts can be attached to the tread. The rubber part may also be patched in any well-known manner underneath the rim 4 so that the rubber part can easily have its two ends brought together. Such a patched rubber part consisting of two joined parts 1$^a$ and 1$^b$ is shown in Figs. 12 and 14.

Having thus described my invention what I claim and desire to secure by Letters Patent is:

1. In a tread or tire, the combination of a floated unbroken boltless inwardly flanged binding circular rim provided with holes at suitable distances apart, a rubber tire having its outside treading circumference molded into studs adapted to fit through and to have their necks surrounded, supported and protected by the walls of the said holes and having its inside circumference molded with inverted dish-shaped recessed air spaces opposite the said studs, and washers adapted to fit and lie fixed in the said air spaces; said washers having screw-threaded holes to take the ends of bolts passing through the felly and rim of the wheel proper; all substantially as and for the purposes specified.

2. A pneumatic stud tread or tire suitably fixed over a wheel proper and consisting of a rubber part whose outside treading circumference is molded into suitable studs and whose inside base circumference is molded with recessed air spaces corresponding in position with said studs, and a binding floating unbroken boltless inwardly flanged steel rim having holes to take protect and support the necks of said rubber studs, substantially as described.

3. The combination with the felly and the rim, of a rubber part resting on the rim and having a continuous flat base and having hollow studs forming a treading surface, a flanged steel rim resting on the base of said rubber part and having a plurality of perforations in which the studs of the rubber part snugly fit, washers snugly fitting in the hollow of the studs of the rubber part, and means for connecting said washers and the felly.

4. The combination with the felly and the rim, of a rubber part resting on the rim and having a continuous flat base and having hollow studs forming a treading surface, a flanged steel rim resting on the base of said rubber part and having a plurality of perforations in which the studs of the rubber part snugly fit, washers snugly fitting in the hollows of the studs of the rubber part, and bolts passing through the felly and the rim and engaging said washers without contacting with the rubber part; said rubber part having a plurality of slits in its inner circumference.

In witness whereof I have hereunto set my hand in the presence of two witnesses.

EDWARD BRICE KILLEN.

Witnesses:
   Thos. Liddle,
   John T. Liddle.